United States Patent
Lee et al.

(10) Patent No.: US 9,786,968 B2
(45) Date of Patent: Oct. 10, 2017

(54) BATTERY MODULE ASSEMBLY HAVING COOLANT FLOW CHANNEL

(71) Applicant: LG CHEM, LTD., Seoul (KR)

(72) Inventors: Bum Hyun Lee, Daejeon (KR); Ji Young Choi, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 44 days.

(21) Appl. No.: 14/894,805

(22) PCT Filed: Jul. 29, 2014

(86) PCT No.: PCT/KR2014/006913
§ 371 (c)(1),
(2) Date: Nov. 30, 2015

(87) PCT Pub. No.: WO2015/016564
PCT Pub. Date: Feb. 5, 2015

(65) Prior Publication Data
US 2016/0134000 A1 May 12, 2016

(30) Foreign Application Priority Data
Jul. 31, 2013 (KR) .................. 10-2013-0090752

(51) Int. Cl.
*H01M 2/10* (2006.01)
*H01M 10/6557* (2014.01)
(Continued)

(52) U.S. Cl.
CPC ..... *H01M 10/6557* (2015.04); *H01M 2/1077* (2013.01); *H01M 10/613* (2015.04); *H01M 10/647* (2015.04); *H01M 10/6556* (2015.04)

(58) Field of Classification Search
CPC .. H01M 2/021; H01M 4/13; H01M 10/04312; H01M 10/052; H01M 10/0525; H01M 10/0565; H01M 6/164; B29C 65/02
See application file for complete search history.

(56) References Cited

U.S. PATENT DOCUMENTS 5,643,693 A * 7/1997 Hill ................... H01M 2/1083
429/121
2006/0115721 A1 6/2006 Lee et al.
(Continued)

FOREIGN PATENT DOCUMENTS

JP 2012-054052 A 3/2012
KR 10-2007-0039708 A 4/2007
(Continued)

OTHER PUBLICATIONS

International Search Report issued in PCT/KR2014/006913, dated Nov. 20, 2014.

*Primary Examiner* — Mark F Huff
*Assistant Examiner* — Monique Wills
(74) *Attorney, Agent, or Firm* — Birch, Stewart, Kolasch & Birch, LLP

(57) ABSTRACT

Disclosed herein is a battery module assembly including unit modules, each of which includes unit cells mounted to a cartridge in a state of being electrically connected to each other via bus bars, the battery module assembly including two or more sub-modules, each of which includes two or more unit modules vertically stacked from a ground to form a coolant flow channel at an interface therebetween, the sub-modules being arranged in a lateral direction in a state of being spaced apart from each other to provide the coolant flow channel, a base plate, on which the sub-modules are loaded, side cover plates mounted at sides of the sub-modules, each of the side cover plates having at least one coolant inlet port, through which a coolant is introduced, and
(Continued)

a bracket for fixing ends of the sub-modules, the bracket having a coolant outlet port communicating with the coolant flow channel.

20 Claims, 15 Drawing Sheets

(51) Int. Cl.
*H01M 10/647* (2014.01)
*H01M 10/6556* (2014.01)
*H01M 10/613* (2014.01)

(56) References Cited

U.S. PATENT DOCUMENTS

| | | | |
|---|---|---|---|
| 2007/0134524 A1 | 6/2007 | Cho et al. | |
| 2012/0064383 A1* | 3/2012 | Tonomura | H01M 2/021 |
| | | | 429/99 |
| 2012/0125447 A1* | 5/2012 | Fuhr | H01M 2/0262 |
| | | | 137/260 |
| 2013/0045403 A1 | 2/2013 | Shin et al. | |
| 2013/0241493 A1 | 9/2013 | Kosaki et al. | |
| 2013/0341111 A1 | 12/2013 | Lee et al. | |
| 2014/0205888 A1* | 7/2014 | Kim | H01M 2/206 |
| | | | 429/158 |
| 2014/0227577 A1 | 8/2014 | Lee et al. | |

FOREIGN PATENT DOCUMENTS

| | | |
|---|---|---|
| KR | 10-0726503 B1 | 6/2007 |
| KR | 10-0937897 B1 | 1/2010 |
| KR | 10-2012-0129790 A | 11/2012 |
| KR | 10-2013-0084722 A | 7/2013 |

* cited by examiner

[FIG. 1]
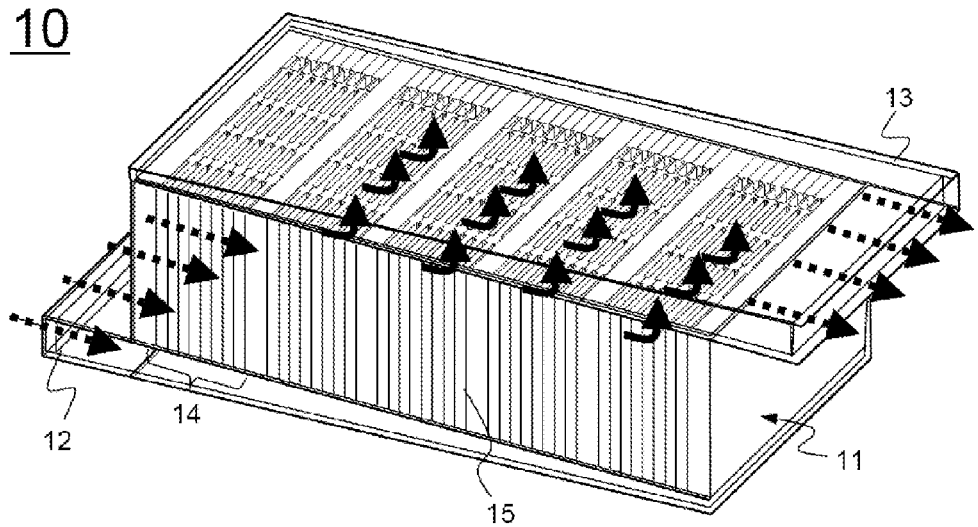
[FIG. 2]
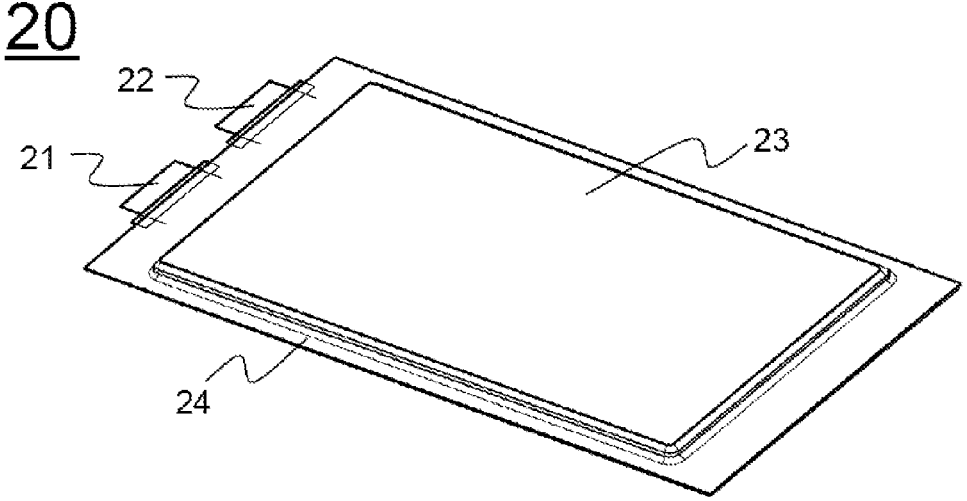

[FIG. 3]
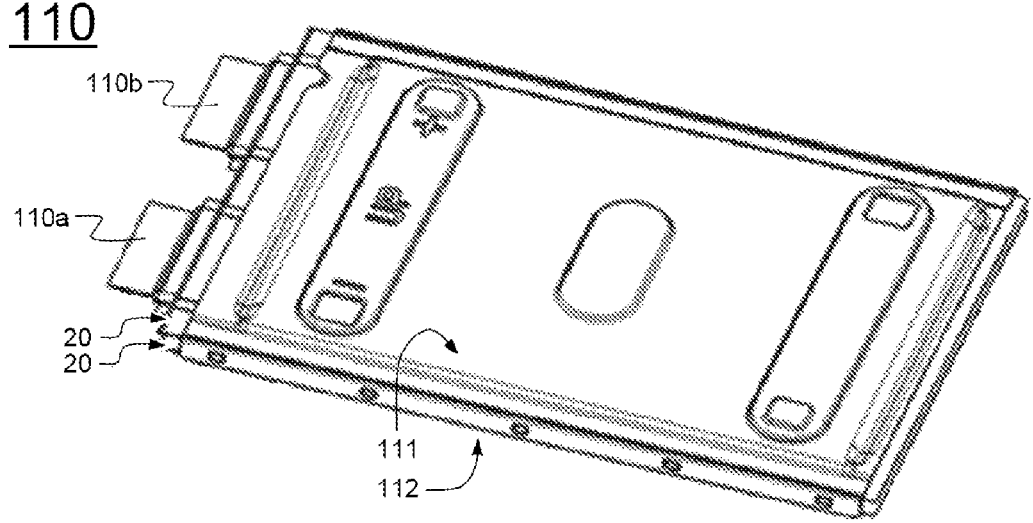
[FIG. 4]
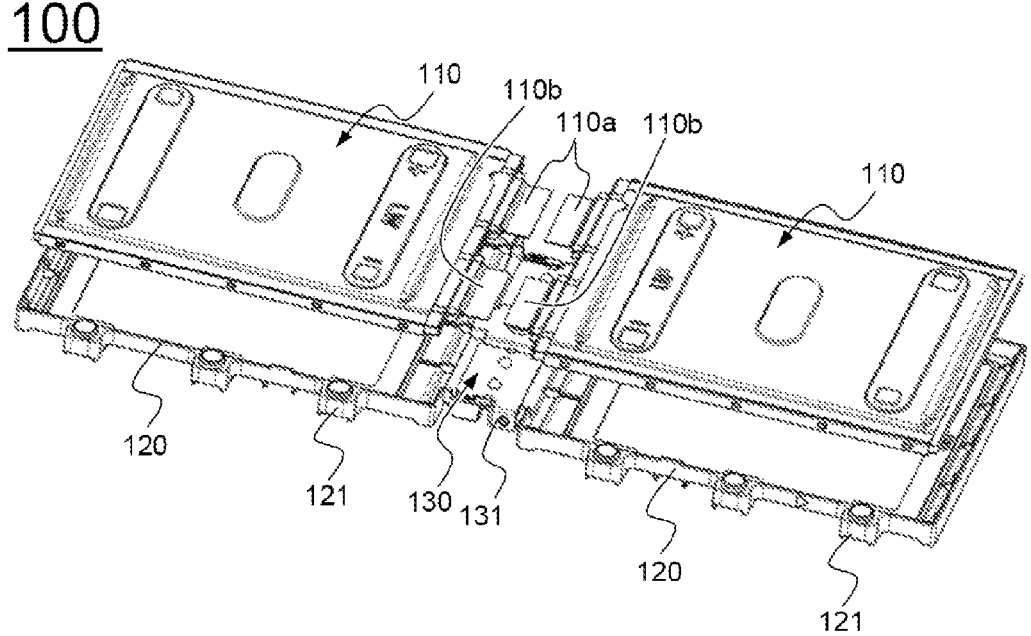

[FIG. 5]
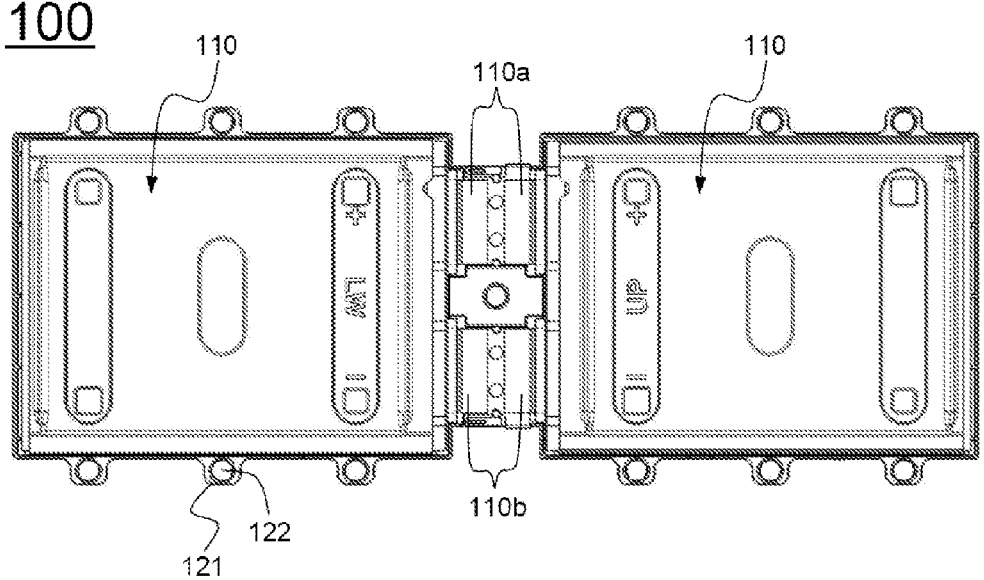
[FIG. 6]
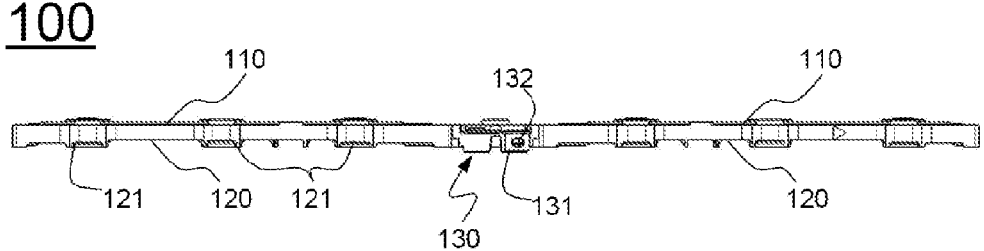

[FIG. 7]
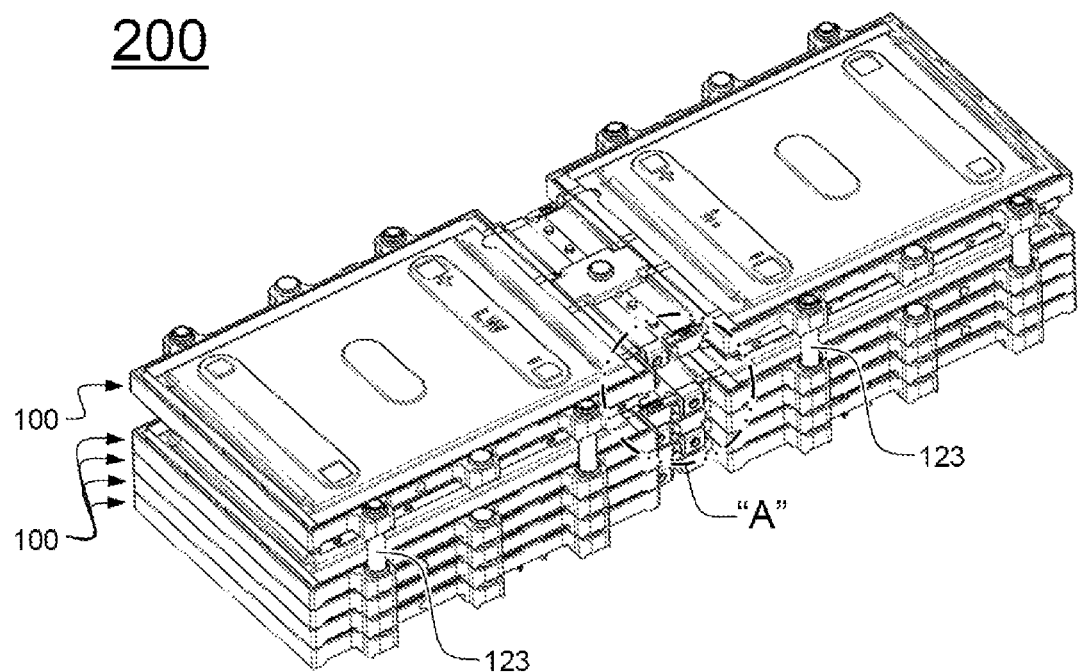

[FIG. 8]
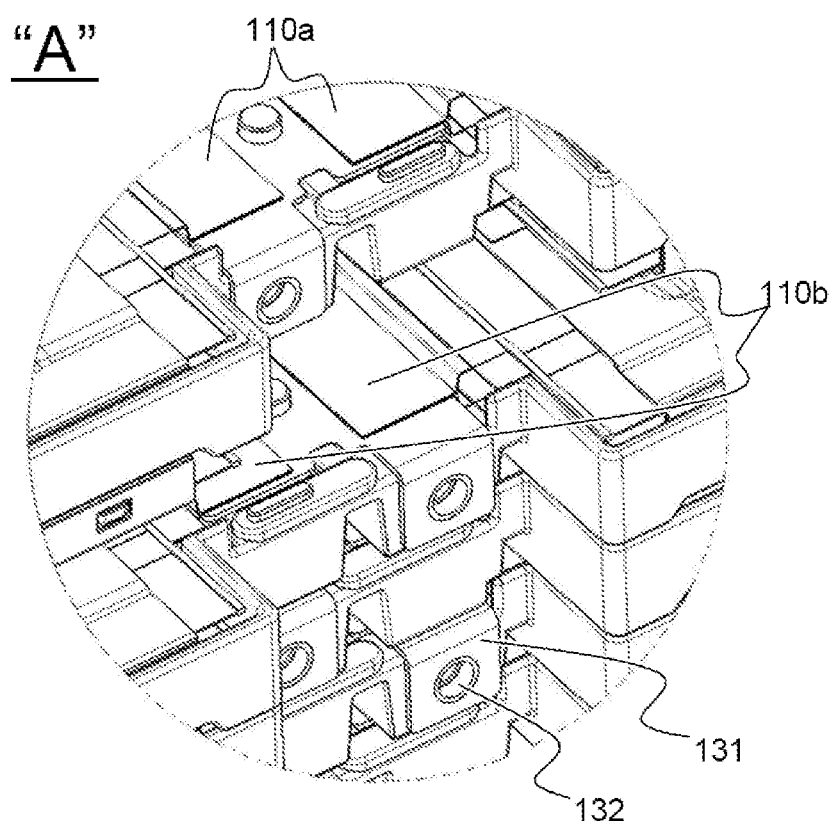

[FIG. 9]
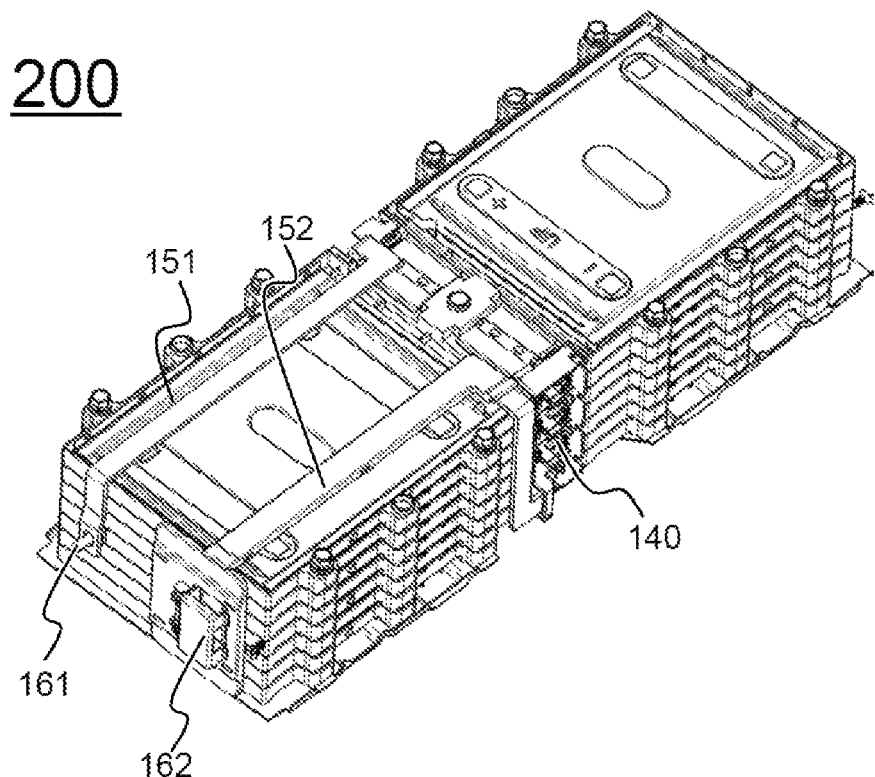

[FIG. 10]
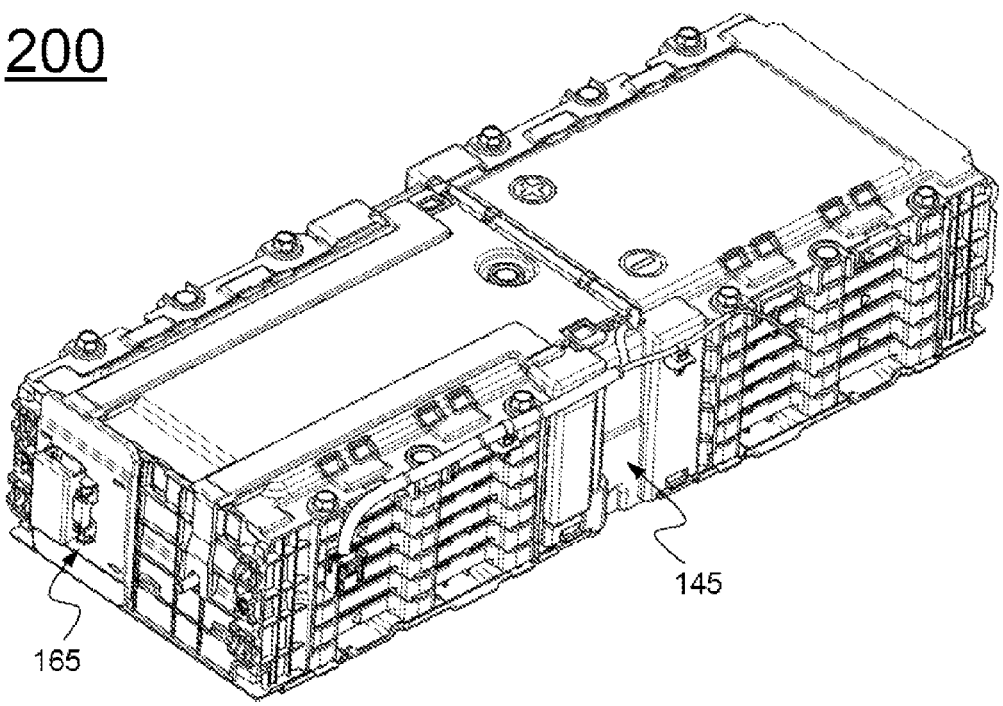
[FIG. 11]
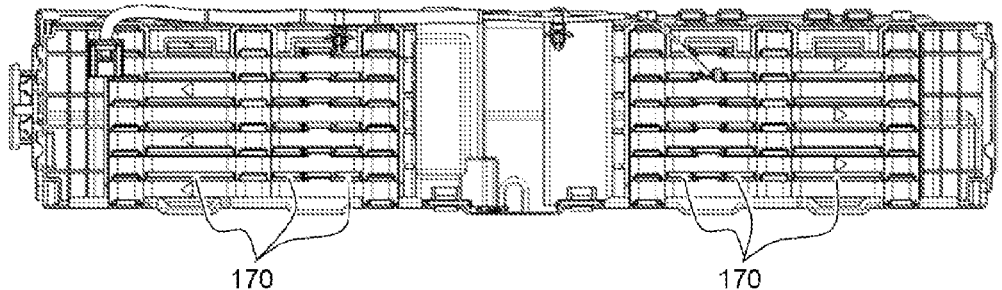

[FIG. 12]
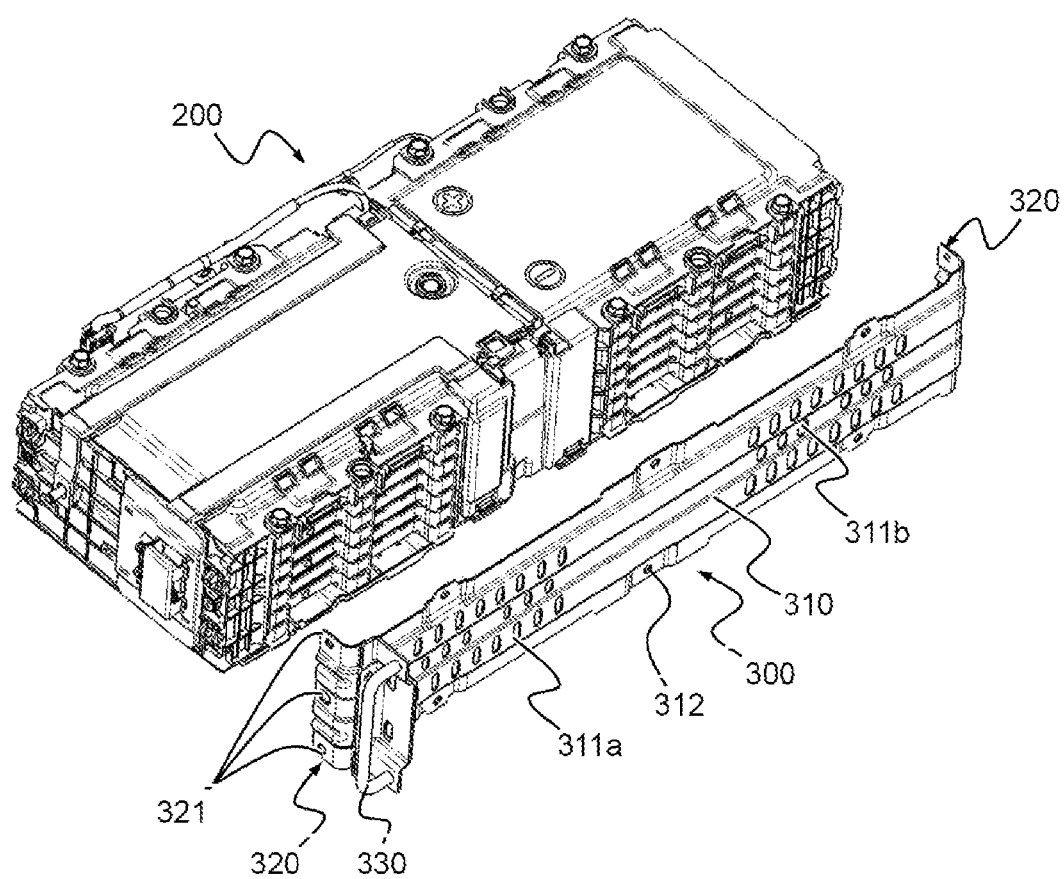

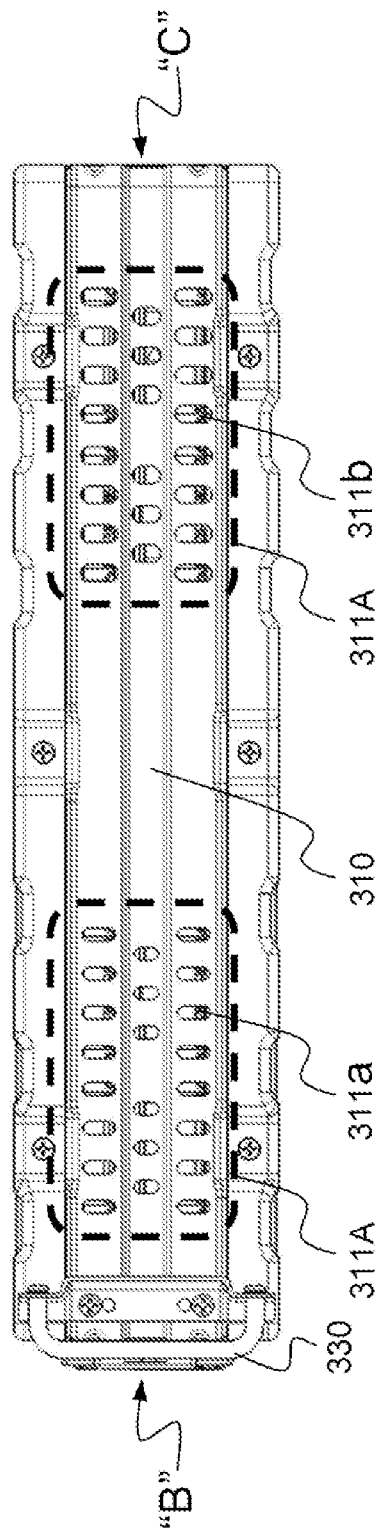

[FIG. 14]
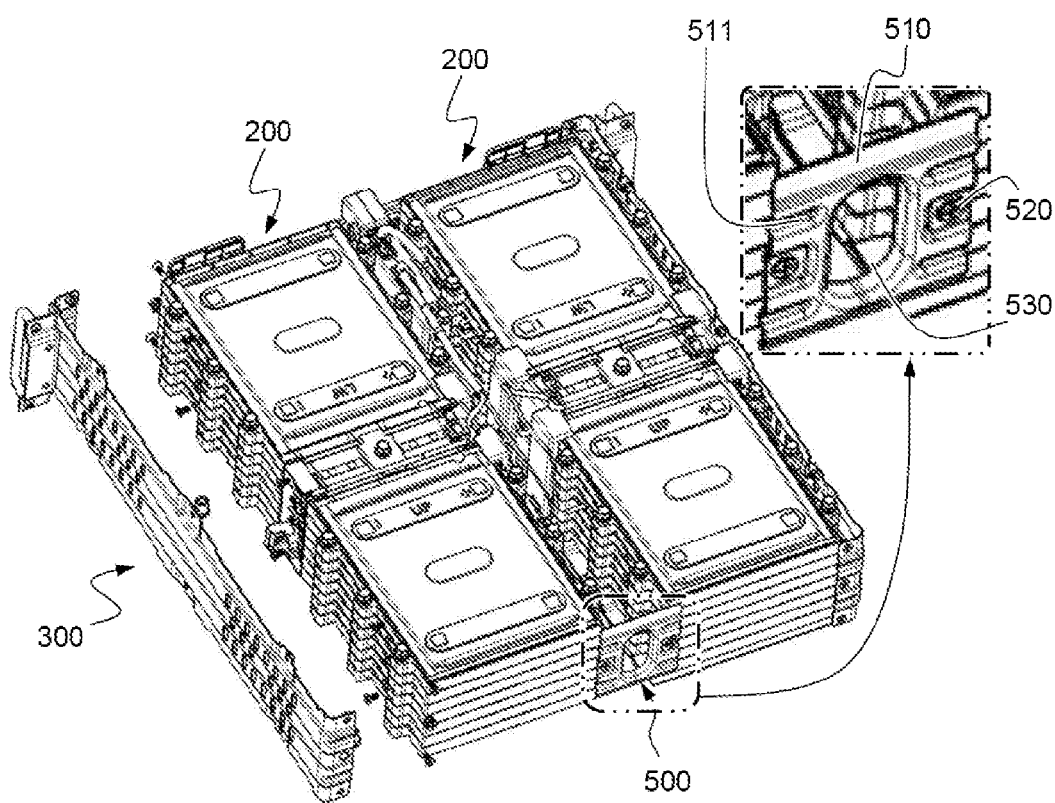

[FIG. 15]
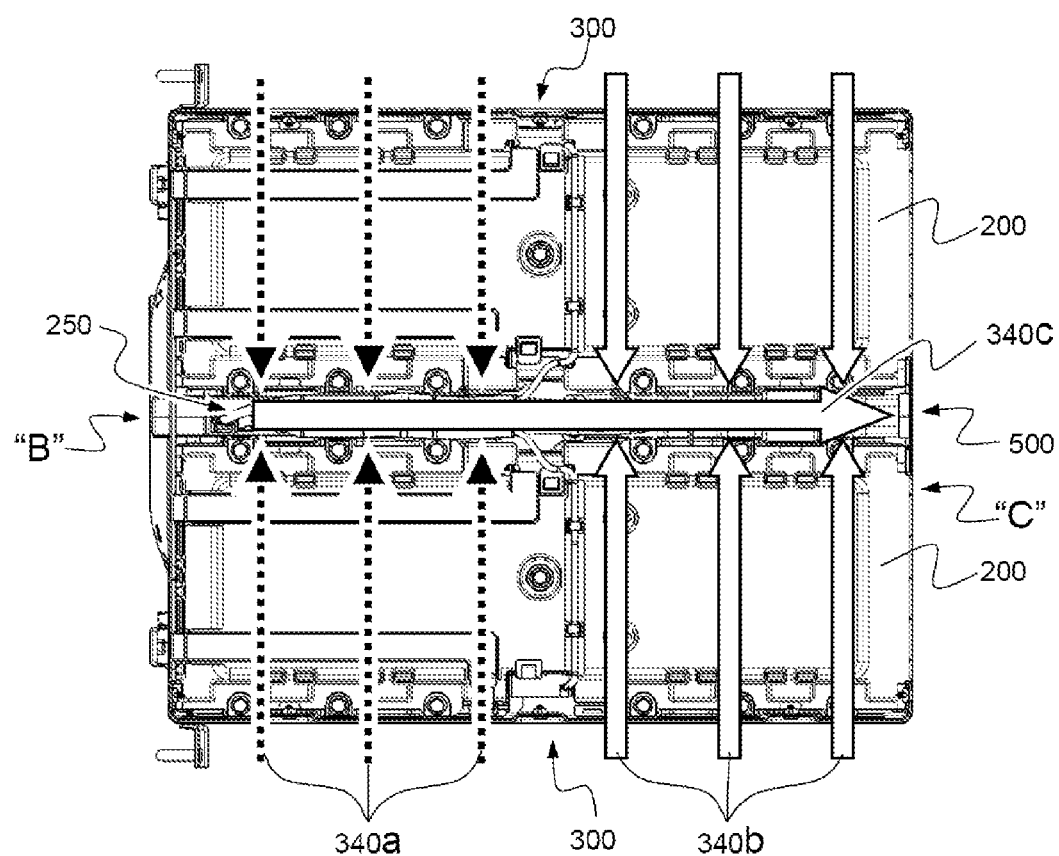

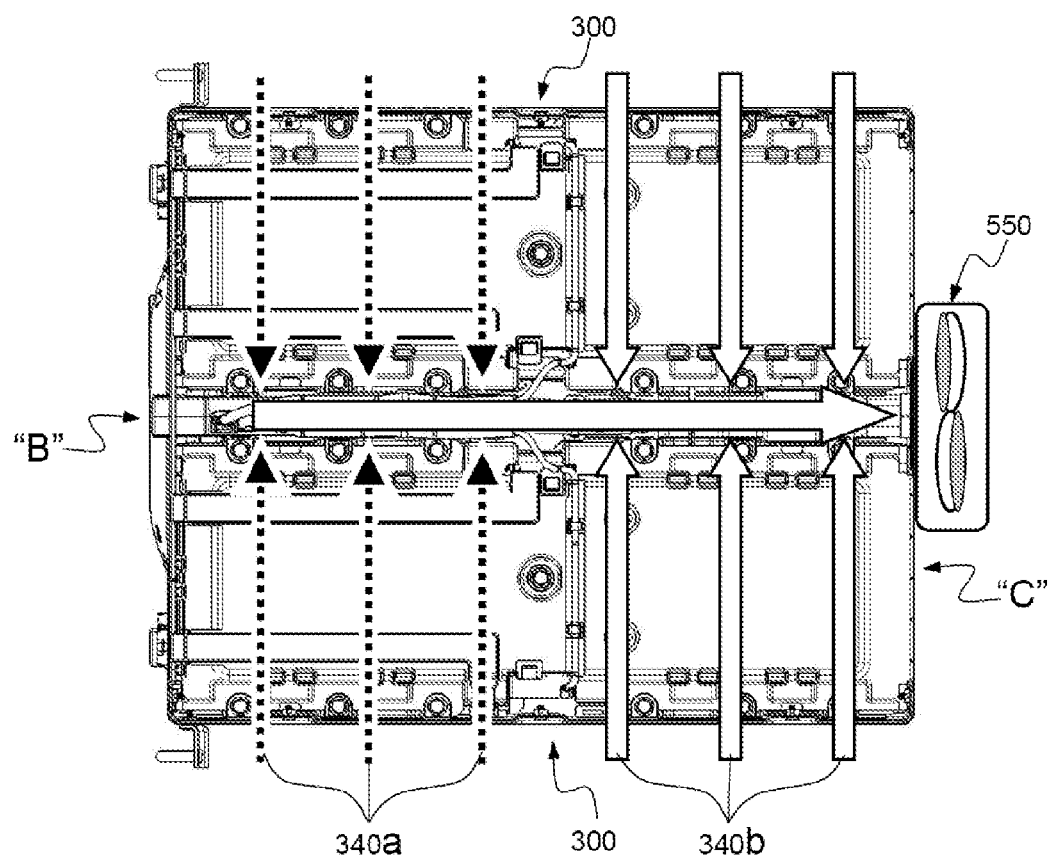
[FIG. 16]

[FIG. 17]
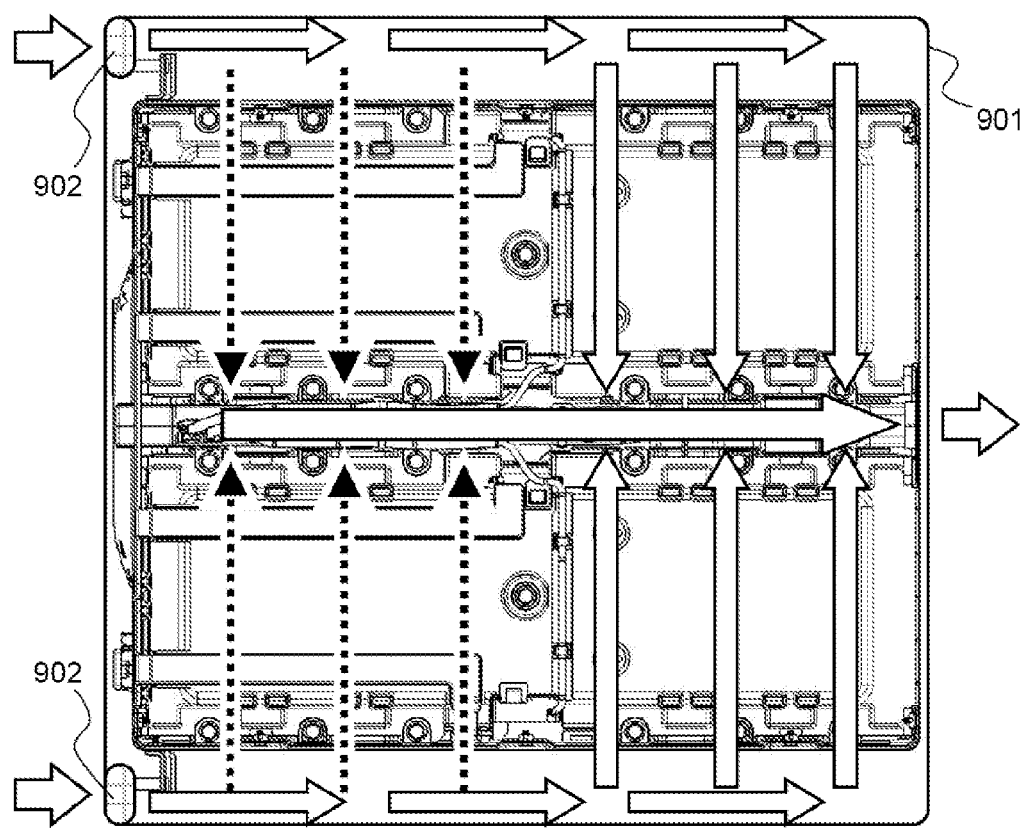

[FIG. 18]
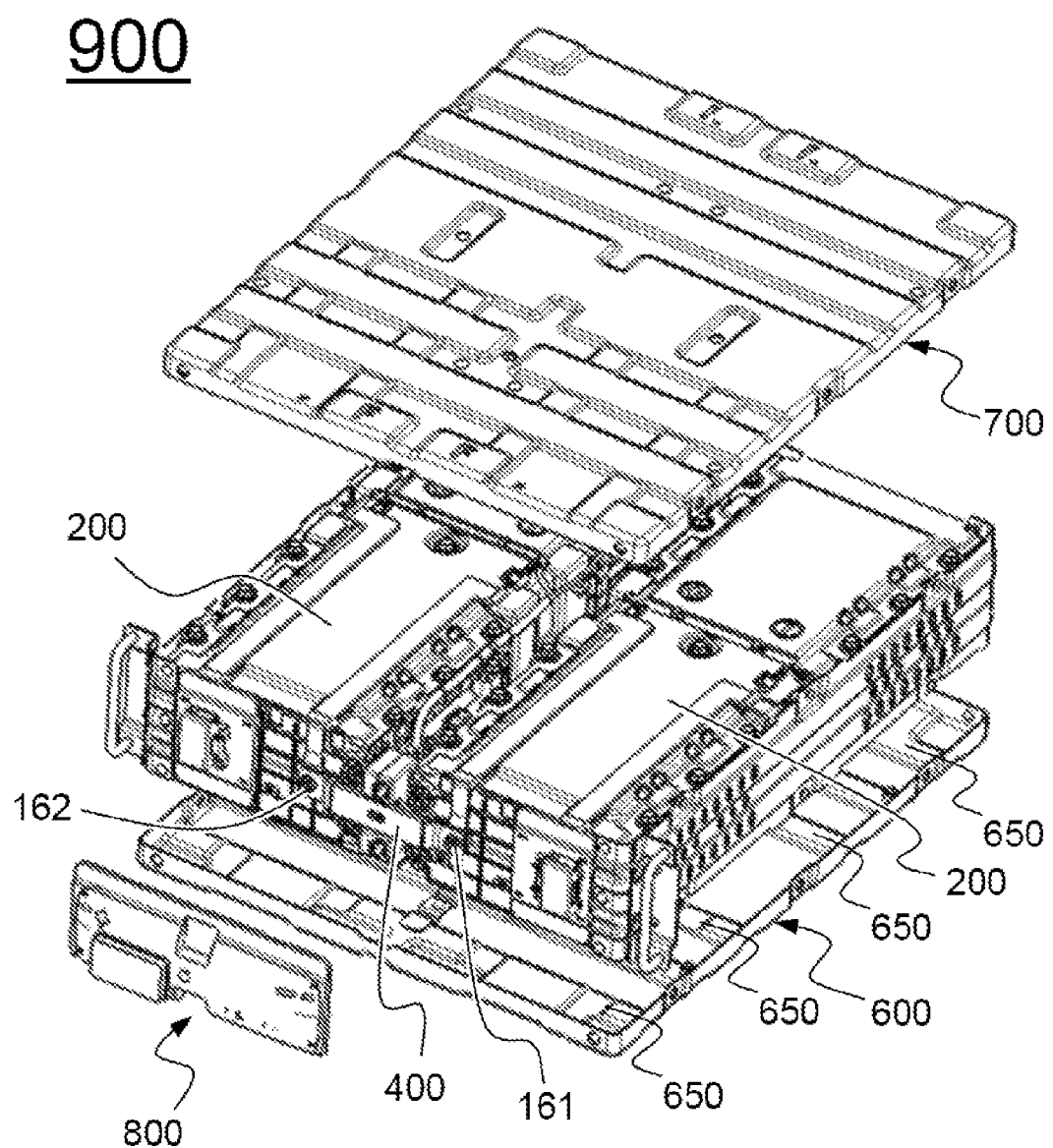

[FIG. 19]
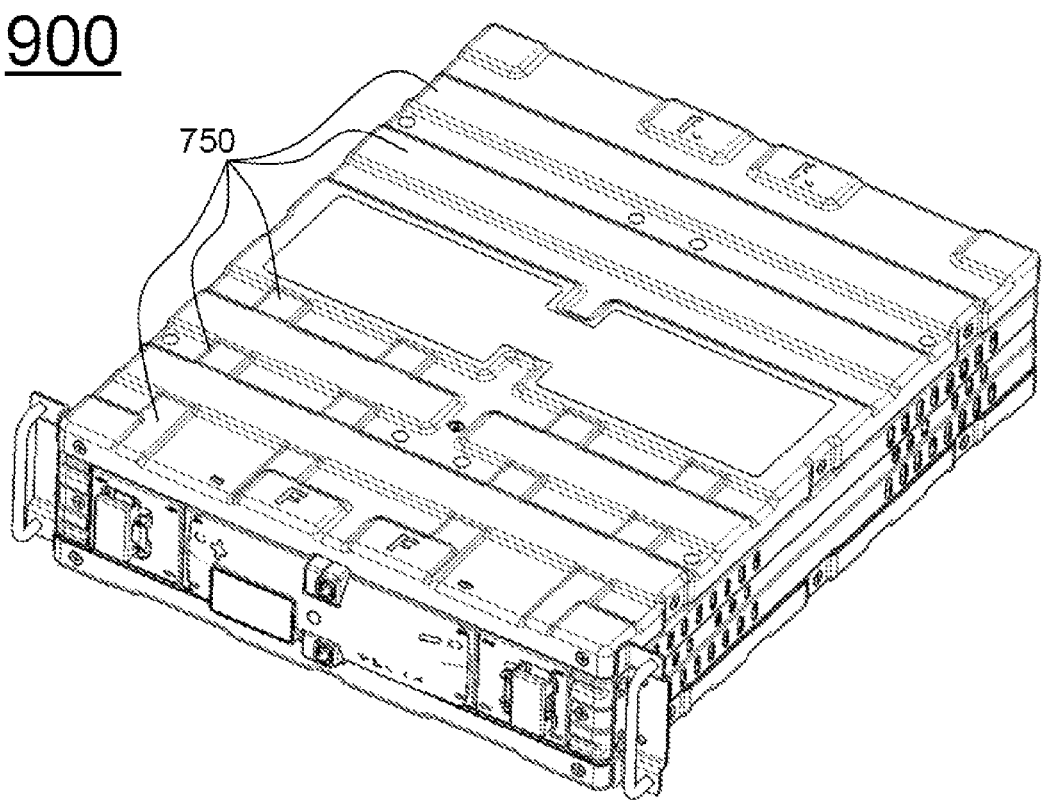

BATTERY MODULE ASSEMBLY HAVING COOLANT FLOW CHANNEL

TECHNICAL FIELD

The present invention relates to a battery module assembly having a coolant flow channel, and more particularly to a battery module assembly including unit modules, each of which includes unit cells mounted to a cartridge in a state of being electrically connected to each other via bus bars, the battery module assembly including two or more sub-modules, each of which includes two or more unit modules vertically stacked from a ground to form a coolant flow channel at an interface therebetween, the sub-modules being arranged in a lateral direction in a state of being spaced apart from each other to provide the coolant flow channel, a base plate, on which the sub-modules are loaded, side cover plates mounted at sides of the sub-modules, each of the side cover plates having at least one coolant inlet port, through which a coolant is introduced, and a bracket for fixing ends of the sub-modules, the bracket having a coolant outlet port communicating with the coolant flow channel.

BACKGROUND ART

Secondary batteries have also attracted considerable attention as an energy source for electric vehicles, hybrid electric vehicles, etc., which have been developed to solve problems, such as air pollution, caused by existing gasoline and diesel vehicles using fossil fuels.

In addition, technology related to power storage apparatuses that store electric power and stably supplies the stored electric power to a power system when needed has been developed. The power storage apparatuses are apparatuses that store electric power when power demand is low and supply the stored electric power in case of overload or emergency. The power storage apparatuses provide the effect of improving quality of electric power and energy efficiency. In particular, a market for household power storage apparatuses and middle-sized industrial or commercial power storage apparatuses has been rapidly expanding as the power storage apparatuses are related to smart grid technology.

As a result, kinds of applications using the secondary batteries are being increased owing to advantages of the secondary batteries, and hereafter the secondary batteries are expected to be applied to more applications and products than now.

As applications and products, to which the secondary batteries are applicable, are increased, kinds of batteries are also increased such that the batteries can provide powers and capacities corresponding to the various applications and products. In addition, there is a strong need to reduce the size and weight of the batteries applied to the corresponding applications and products.

For example, small-sized mobile devices, such as mobile phones, personal digital assistants (PDA), digital cameras, and laptop computers, use one or several small-sized, lightweight battery cells for each device according to the reduction in size and weight of the corresponding products. On the other hand, middle or large-sized devices, such as electric vehicles, hybrid electric vehicles, and power storage apparatuses, use a middle or large-sized battery module or battery pack having a plurality of battery cells electrically connected with each other because high output and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

Meanwhile, a larger amount of heat is generated from such a high-output, large-capacity secondary battery during charge and discharge of the secondary battery. If heat generated from unit cells of the battery during charge and discharge of the unit cells is not effectively removed from the unit cells, the heat accumulates in the unit cells with the result that deterioration of the unit cells is caused. In addition, if some of the unit cells are overheated due to various causes, the battery may catch fire or explode. For this reason, a cooling system is indispensable for a middle or large-sized battery pack having high output and large capacity The middle or large-sized battery pack is generally cooled by the flow of a coolant. For example, a coolant flow cooling system that performs cooling through the flow of a coolant, such as air, between unit batteries or battery modules of the battery pack using a cooling fan. However, this coolant flow cooling system has several problems.

First, a temperature deviation between unit batteries is very large. The battery pack includes a plurality of unit batteries. In a state in which each of the unit batteries is in an optimal state of operation, the battery pack may also be in an optimal state of operation. Consequently, such a large temperature deviation between the unit batteries may accelerate deterioration of the batteries and make it difficult to optimize the state of operation of the battery pack.

Second, the conventional cooling system causes the increase in size of the battery pack. For example, the large-sized battery pack may not be applicable to electric vehicles (EV) or hybrid electric vehicles (HEV) since the size of the battery pack that can be mounted in the electric vehicles or the hybrid electric vehicles is limited.

FIG. 1 is a typical view showing a conventional representative battery pack cooling system.

A battery pack cooling system 10 includes a battery pack 11 including a plurality of batteries, a coolant introduction part 12 mounted at the lower part of the battery pack 11, and a coolant discharge part 13 mounted at the upper part of the battery pack 11. The battery pack 11 includes a plurality of battery groups 14 electrically connected to each other. Each of the battery groups 14 includes a plurality of unit batteries 15 electrically connected to each other. A small gap, through which a coolant may flow, is formed between the unit batteries 15 of each of the battery groups 14. Consequently, a coolant introduced from the coolant introduction part 12 flows through the gaps. At this time, the coolant removes heat generated by the unit batteries 15. After that, the coolant is discharged through the coolant discharge part 13 mounted at the upper part of the battery pack 11.

In the above structure, the coolant introduction part 12 and the coolant discharge part 13 are provided at the lower part and the upper part of the battery pack 11, respectively. As a result, it is necessary to provide spaces, in which coolant guide members will be mounted, at the lower part and the upper part of the battery pack 11, which further increases the overall size of the battery pack.

Meanwhile, vehicles, such as electric vehicles (EV) or hybrid electric vehicles (HEV), or power storage apparatuses may operate under various conditions. An optimal operation condition of each unit battery constituting a battery pack is generally decided within a specific temperature range although the optimal operation condition of each unit battery may vary due to various causes. Since each unit battery operates in a low temperature state in winter, on the other hand, it is necessary to adjust the battery pack such that the battery pack operates within the optimal operation temperature range. In this case, the cooling system may be stopped, or the temperature of a coolant (e.g. air) introduced into the system may be increased, such that the battery pack is not cooled but the temperature of the battery pack is increased. If the unit batteries are in a very low temperature state, however, components of the batteries may be damaged. In addition, deterioration of the battery pack may be accelerated due to abrupt increase in temperature of the battery pack.

Consequently, there is a high necessity for technology that is capable of fundamentally solving the above problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have developed a battery module assembly configured to have a structure in which the battery module assembly includes sub-modules arranged in a lateral direction in a state of being spaced apart from each other to provide a coolant flow channel having a specific structure, side cover plates having a coolant inlet port, and a bracket having a coolant outlet port, thereby restraining the increase in volume of the battery module assembly and, at the same time, achieving an improved cooling effect and a uniform cooling effect of the battery module assembly.

Consequently, it is an object of the present invention to provide a battery module assembly configured to have a structure in which battery module assembly can be assembled to have a compact structure, and no additional component for improving cooling efficiency of the battery module is needed, thereby improving efficiency of a production process while providing the compact structure and improving cooling efficiency.

Technical Solution

In accordance with one aspect of the present invention, the above and other objects can be accomplished by the provision of a battery module assembly including unit modules, each of which includes unit cells mounted to a cartridge in a state of being electrically connected to each other via bus bars, the battery module assembly including two or more sub-modules, each of which includes two or more unit modules vertically stacked from a ground to form a coolant flow channel at an interface therebetween, the sub-modules being arranged in a lateral direction in a state of being spaced apart from each other to provide the coolant flow channel, a base plate, on which the sub-modules are loaded, side cover plates mounted at sides of the sub-modules, each of the side cover plates having at least one coolant inlet port, through which a coolant is introduced, and a bracket for fixing ends of the sub-modules, the bracket having a coolant outlet port communicating with the coolant flow channel.

In the battery module assembly according to the present invention, the coolant flow channel having the specific structure as described above is provided. Consequently, it is possible to restrain the increase in volume of the battery module assembly and, at the same time, to achieve an improved cooling effect and a uniform cooling effect of the battery module assembly.

In addition, the battery module assembly may be assembled to have a compact structure, and no additional component for improving cooling efficiency of the battery module is needed, thereby improving efficiency of a production process while providing the compact structure.

In a concrete example, each of the unit cells may be a plate-shaped battery cell or a battery cell assembly including two or more plate-shaped battery cells mounted in a cell cover in a state in which electrode terminals of the battery cells are exposed.

Each of the battery cells may be a prismatic secondary battery or a pouch-shaped secondary battery.

The prismatic secondary battery may be configured to have a structure in which an electrode assembly is mounted in a prismatic metal case in a sealed state, and the pouch-shaped secondary battery may be configured to have a structure in which an electrode assembly is mounted in a laminate sheet including a resin layer and a metal layer in a sealed state.

Specifically, the secondary battery may be a lithium secondary battery exhibiting high energy density, discharge voltage, and output stability. Other components of the lithium secondary battery will hereinafter be described in detail.

In general, the lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed. On the other hand, the negative electrode may be manufactured by applying a mixture of a negative electrode active material and a binder to a negative electrode current collector and drying the mixture. The above-mentioned ingredients may be further included as needed.

The separator is disposed between the negative electrode and the positive electrode. The separator may be made of an insulative thin film exhibiting high ion permeability and mechanical strength.

The non-aqueous electrolytic solution containing lithium salt consists of a non-aqueous electrolytic solution and lithium salt. A liquid non-aqueous electrolytic solution, a solid electrolyte, or an inorganic solid electrolyte may be used as the non-aqueous electrolytic solution.

The current collectors, the electrode active materials, the conductive agent, the binder, the filler, the separator, the electrolytic solution, and the lithium salt are well known in the art to which the present invention pertains, and therefore a detailed description thereof will be omitted.

The lithium secondary battery may be manufactured using an ordinary method well known in the art to which the present invention pertains. That is, the lithium secondary battery may be manufactured by disposing a porous separator between a positive electrode and a negative electrode and then injecting an electrolytic solution thereinto.

The positive electrode may be manufactured, for example, by applying a slurry containing a lithium transition metal oxide active material, a conductive agent, and a binder to a current collector and then drying the applied slurry. In the same manner, the negative electrode may be manufactured, for example, by applying a slurry containing a carbon active material, a conductive agent, and a binder to a thin current collector and then drying the applied slurry.

For the battery cell assembly, which is an example of each of the unit cells, the cell cover may include a pair of sheathing members coupled to each other for covering outer surfaces of the battery cells excluding the electrode terminals. For example, two battery cells may be mounted in the cell cover. The two battery cells may be stacked such that the battery cells are connected in parallel to each other in a state in which electrode terminals having the same polarities abut on each other to constitute a battery cell assembly.

In a concrete example, the unit cells of each of the unit modules may be connected in parallel to each other.

Specifically, the unit cells may be mounted to the cartridge such that the electrode terminals face each other, and the electrode terminals may be connected in parallel to each other via bus bars for connection of the battery cells mounted to the cartridge.

The cartridge, which is an electrically insulative member exhibiting predetermined rigidity, protects the unit cells from external impact and ensures stable mounting of the unit cells. In addition, the unit cells are arranges such that the electrode terminals of the unit cells face each other due to the cartridge, whereby electrical parallel connection between the unit cells via the bus bars is more easily achieved.

Between electrode terminal connection parts of the unit cells may be further mounted a fixing member for fixing the electrode terminal connection parts to proper positions of the cartridge. In a concrete example, the fixing member may include an electrically insulative protrusion mounted on the cartridge, the protrusion having an external shape corresponding to a shape between the electrode terminal connection parts, the protrusion being provided at the middle thereof with a through hole, and a fastening part that is inserted through the through hole to couple the protrusion to the cartridge.

When external impact is applied, therefore, the unit cells may be stably fixed and mounted to the cartridge.

In addition, each cartridge may be provided at opposite sides thereof with protrusions each having a fastening hole, and the cartridges be coupled to each other using fastening members inserted through the fastening holes to constitute the sub-modules. Consequently, the unit cells may be fixed by the cartridge and, at the same time, the cartridges may be fastened to each other by coupling through the fastening holes. Consequently, it is possible to achieve a more secure and stable fixing effect. The cartridges may be fastened to each other, for example, by inserting bolts through the fastening holes. However, the present invention is not limited thereto.

In a concrete example, one end of a surface of each of the bus bars for connection of the unit cells, to which a corresponding one of the electrode terminals is coupled, may be bent upward or downward, and the bent end may be connected to a connection member such that adjacent unit modules are electrically connected to each other.

In addition, the unit modules of each of the sub-modules may be connected in series or in parallel to each other. For example, the unit modules may be stacked differently while the connection members are mounted on the same position to provide a parallel connection structure.

In a concrete example, each of the side cover plates may be provided with at least one coolant inlet port, through which a coolant is introduced.

As previously defined, the unit modules of each of the sub-modules are stacked such that the coolant flow channel is formed at the interface therebetween, and the sub-modules are arranged in a state of being spaced apart from each other to provide the coolant flow channel.

In a concrete example, each of the side cover plates, which are mounted at the sides of the sub-modules such that the side cover plates are mounted and fixed to the base plate and the upper cover plate of the sub-modules, may include a main body for covering a corresponding one of the sides of the sub-modules, fixing parts formed at opposite ends of the main body, the fixing parts extending while being bent in a shape of covering the sub-modules, the fixing parts being fastened and fixed to the sub-modules, and a handle formed at one end of the main body, and the coolant inlet port may be formed at the main body.

The shape of the coolant inlet port is not particularly restricted so long as the coolant can be introduced through the coolant inlet port. For example, the coolant inlet port may be formed in the shape of a circle, an oval, a polygon, or a slit when viewed above.

In a more concrete example, the coolant inlet port may include a first inlet port group comprising two or more first inlet ports and a second inlet port group comprising two or more second inlet ports. In addition, the first inlet port group may be located at the front part of the battery module assembly, and the second inlet port group may be located at the rear part of the battery module assembly, in a direction in which the coolant is introduced into the battery module assembly.

According to circumstances, the size of the first inlet ports may be different from that of the second inlet ports to adjust the volume of the coolant introduced through the inlet ports. In a concrete example, the second inlet ports may have an area equivalent to 110 to 300% greater than that of the first inlet ports.

In the battery module assembly including the first inlet ports and the second inlet ports having the above-described structure, therefore, the flow rate of the coolant introduced into the front part of the battery module assembly may be equal to that of the coolant introduced into the rear part of the battery module assembly. Specifically, the volume of the coolant introduced into the front part of the battery module assembly may be substantially equal to that of the coolant introduced into the rear part of the battery module assembly in spite of the difference in position of the inlet ports. As a result, it is possible to considerably reduce a temperature deviation between the unit module adjacent to the coolant inlet port and the unit module distance from the coolant inlet port, thereby achieving a uniform cooling effect of the battery module assembly.

The coolant outlet port communicating with the coolant flow channel may be formed at the bracket. Specifically, the coolant flow channel defined between the sub-modules and the coolant outlet port of the bracket may be formed in a straight line when viewed above.

In a concrete example, the coolant introduced through the coolant inlet port flows along the coolant flow channel formed at the interface between the stacked unit modules to remove heat from the unit modules, is introduced into the coolant flow channel between the sub-modules, and is then discharged through the coolant outlet port formed at the rear of the battery module assembly. That is, the coolant generally flows in the shape of T when viewed above.

A fan or a discharge duct may be mounted at the coolant outlet port in order to further improve the cooling effect.

In a concrete example, the bracket, which is a member for fixing the sub-modules such that a space between the sub-modules is maintained, may include a plate-shaped main body, a fixing part, and an output port formed through a middle of the main body, the main body may be provided at each end thereof with a concave and convex part corresponding in shape to a concave and convex structure of the rears of the sub-modules, and the fixing part may be provided with a fastening hole, through which the bracket is fastened and fixed to the rears of the sub-modules.

In the battery module assembly having the structure as described above, the coolant flow channel is formed at the interface between the stacked unit modules, the coolant inlet port, which supplies the coolant to the coolant flow channel, is formed at each of the side cover plates, and the inlet discharge port, through which the coolant, after cooling the unit modules, is discharged, is formed at the bracket located at the rears of the sub-modules. Consequently, it is possible to uniformly cool the unit modules constituting the battery module assembly, thereby achieving an overall cooling effect of the battery module assembly with improved efficiency.

In a concrete example, the battery module assembly may further include an upper cover plate loaded on top surfaces of the sub-modules, the upper cover plate being fastened and coupled to the sub-modules and the side cover plates, and a front cover plate mounted at fronts of the sub-modules in a direction in which the coolant is introduced into the battery module assembly, the front cover plate being fastened and coupled to the sub-modules, the base plate, and the side cover plates.

The upper cover plate may be made of a plate material exhibiting predetermined rigidity and elasticity. The upper cover plate may integrate the sub-modules and, at the same time, protects the sub-modules from external impact.

The upper cover plate is not particularly restricted so long as the upper cover plate is manufactured by machining. In a concrete example, the upper cover plate may be manufactured by pressing.

Reinforcement beads configured to have a concave and convex structure may be formed at outer surfaces of the upper cover plate and the base plate in order to improve rigidity of the upper cover plate and the base plate.

According to circumstances, the upper cover plate and the base plate may be provided with fastening holes for fastening and coupling to the sub-modules.

In this case, the sub-modules may be fastened and, at the same time, fixed to the upper cover plate and the base plate, whereby it is possible to achieve a more secure and stable fixing effect. For example, the sub-modules may be fastened to the upper cover plate and the base plate by inserting bolts through the fastening holes. However, the present invention is not limited thereto.

In accordance with another aspect of the present invention, there is provided a device including the battery module assembly with the above-stated construction as a power source. Specifically, the device may be an electric vehicle, a hybrid electric vehicle, a plug-in hybrid electric vehicle, a power storage apparatus, a power supply for emergency, a power supply for computer rooms, a portable power supply, a power supply for medical facilities, a power supply for fire extinguishing facilities, a power supply for alarm facilities, or a power supply for refuge facilities. However, the present invention is not limited thereto.

The structure and manufacturing method of the device are well known in the art to which the present invention pertains and thus a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view, partially see-through, showing a conventional battery pack cooling system;

FIG. 2 is a perspective view showing a pouch-shaped battery cell according to the present invention;

FIG. 3 is a perspective view showing a unit cell configured to have a structure in which battery cells, one of which is shown in FIG. 2, are mounted in a cell cover;

FIG. 4 is a plan view showing a state in which unit cells, one of which is shown in FIG. 3, are mounted to a cartridge to constitute a unit module;

FIG. 5 is a plan view showing a unit module according to the present invention;

FIG. 6 is a side view showing the unit module according to the present invention;

FIG. 7 is a perspective view showing a state in which the unit modules according to the present invention are stacked;

FIG. 8 is a partially enlarged view of FIG. 7;

FIG. 9 is a perspective view showing a state in which series connection members and bus bars for external input and output terminals are mounted to a sub-module according to the present invention;

FIG. 10 is a perspective view showing a state in which an external input and output terminal protection member and a series connection part protection member are mounted to the sub-module of FIG. 9;

FIG. 11 is a side view of FIG. 10;

FIG. 12 is a perspective view showing a state in which a side cover plate is mounted to the sub-module of FIG. 10;

FIG. 13 is a plan view showing a side cover plate according to the present invention;

FIG. 14 is a perspective view showing a state in which two sub-modules according to the present invention are fixed to each other using side cover plates and a bracket;

FIG. 15 is a plan view showing the flow of a coolant in a battery module assembly according to the present invention;

FIGS. 16 and 17 are plan views showing the flow of a coolant in battery module assemblies according to other embodiments of the present invention;

FIG. 18 is a perspective view showing a state in which two sub-modules according to the present invention are electrically connected and fixed to each other via a main bus bar, and a base plate, an upper cover plate, and a front cover plate are mounted to the sub-modules; and FIG. 19 is a perspective view showing the battery module assembly according to the present invention.

BEST MODE

Now, exemplary embodiments of the present invention will be described in detail with reference to the accompanying drawings. It should be noted, however, that the scope of the present invention is not limited by the illustrated embodiments.

FIG. 2 is a perspective view showing a pouch-shaped battery cell according to the present invention.

Referring to FIG. 2, a battery cell 20 is a plate-shaped battery cell 20 having electrode terminals (a positive electrode terminal 21 and a negative electrode terminal 22) formed at one end thereof. Specifically, the plate-shaped battery cell 20 is configured to have a structure in which an electrode assembly (not shown) is mounted in a pouch-shaped case 23 made of a laminate sheet including a metal layer (not shown) and a resin layer (not shown), and a sealed portion 24 is formed at the pouch-shaped case 23, for example, by thermal bonding. The plate-shaped battery cell may also be referred to as a 'pouch-shaped batter cell.'

FIG. 3 is a perspective view showing a unit cell (battery cell assembly) configured to have a structure in which battery cells, one of which is shown in FIG. 2, are mounted in a cell cover.

Referring to FIG. 3 together with FIG. 2, two battery cells 20 are received and fixed in a cell cover 111 and 112 including an upper cell cover 111 and a lower cell cover 112. Electrode terminals 21 and 22 of the battery cells 20 are exposed from one side of the cell cover such that the electrode terminals 21 and 22 of the battery cells 20 are electrically connected in parallel to each other to constitute two electrode terminals 110a and 110b of the unit cell.

FIG. 4 is a plan view showing a state in which unit cells, one of which is shown in FIG. 3, are mounted to a cartridge to constitute a unit module, and FIGS. 5 and 6 are a plan view and a side view showing a unit module according to the present invention, respectively.

Referring to these figures, two unit cells 110 are mounted to a cartridge 120 to constitute a unit module. The unit cells 110 are arranged such that the positive electrode terminals 110a and the negative electrode terminals 110b of the unit cells 110 face each other. In addition, the electrode terminals 110a and 110b are electrically connected in parallel to each other via bus bars 130.

Specifically, the bus bars 130 are electrically coupled to the electrode terminals 110a and 110b. Each of the bus bars 130 is provided at one end thereof with a downwardly bent portion 131. A fastening hole 132 is formed at the bent portion. The fastening hole 132 is used to achieve electrical connection between a plurality of unit modules 100 when the unit modules 100 are stacked (see FIGS. 7 and 8).

In addition, the cartridge 120 is provided at opposite sides thereof with protrusions 121 each having a fastening hole 122. The unit modules 100 may be coupled to each other using fastening members 123 (see FIG. 7) inserted through the fastening holes 122 of the protrusions 121

Each of the protrusions 121 has a height equivalent to 110 to 150% that of the cartridge 120. When the unit modules 100 are stacked, therefore, predetermined gaps 170 (see FIG. 11) are generated at interfaces between the stacked unit modules 100. The gaps 170 (see FIG. 11) may function as a coolant flow channel, along which a coolant may flow.

FIG. 7 is a perspective view showing a state in which the unit modules according to the present invention are stacked.

Referring to FIG. 7, the unit modules 100 are stacked vertically from the ground to a sub-module 200. Specifically, after the unit modules 100 are stacked vertically, fastening members 123 are inserted through the protrusions formed at the opposite sides of unit modules 100 to couple the unit modules 100 to each other.

FIG. 8 is a partially enlarged view of FIG. 7, and FIG. 9 is a perspective view showing a state in which connection members 140 and bus bars 151 and 152 for external input and output terminals are mounted to the sub-module 200 according to the present invention.

Referring to these figures, the unit modules 100 are stacked in a state of being alternately arranged and are electrically connected in series to each other via the connection members 140. In addition, the unit modules 100, which are connected in series to each other, are electrically connected to external input and output terminals 161 and 162 via the bus bars 151 and 152 for external input and output terminals.

FIG. 10 is a perspective view showing a state in which an external input and output terminal protection member and a series connection part protection member are mounted to the sub-module of FIG. 9.

Referring to FIG. 10 together with FIG. 9, an external input and output terminal protection member 165 is mounted to the external input and output terminal 161 of the sub-module 200 in order to protect the external input and output terminal 161 from the outside. In addition, a series connection part protection member 145 is mounted to a series connection part, via which the unit modules 100 are electrically connected in series to each other, in order to protect the series connection part from the outside.

FIG. 11 is a side view of FIG. 10.

Referring to FIG. 11 together with FIG. 6, predetermined gaps 170 are formed at the interfaces between the stacked unit modules 110 constituting the sub-module 200. The gaps 170 (see FIG. 11) may function as a coolant flow channel, along which a coolant may flow.

FIG. 12 is a perspective view showing a state in which a side cover plate is mounted to the sub-module of FIG. 10, and FIG. 13 is a plan view of the side cover plate.

Referring to these figures, a side cover plate 300 includes a main body 310 for covering a side of the sub-module 200. The main body 310 is provided with coolant inlet ports 311a and 311b, through which a coolant is introduced into the sub-module from the outside. In addition, the main body 310 is provided at each end thereof with a bent portion 320 extending while being bent in order to cover the sub-module 200.

Furthermore, fixing parts 312 and 321, which are fastened and fixed to the sub-module 200, are formed at the main body 310 and the bent portion 320 of the side cover plate 300. In addition, a handle 330 is formed at one end of the main body 310.

Specifically, the coolant inlet ports 311a and 311b formed at the main body 310 are divided into a first inlet port group 311A located at a front part B of the battery module assembly and a second inlet port group 311B located at a rear part C of the battery module assembly. In addition, the second coolant inlet ports 311b each have an area 150 to 200% greater than that of each of the first coolant inlet ports 311a.

In the battery module assembly including the inlet ports having the above-described structure, therefore, the flow rate of the coolant introduced into the front part of the battery module assembly may be equal to that of the coolant introduced into the rear part of the battery module assembly.

FIG. 14 is a perspective view showing a state in which two sub-modules are fixed to each other using side cover plates and a bracket.

Referring to FIG. 14, a bracket 500 is mounted to the rears of the two sub-modules 200 such that the two sub-modules 200 are coupled to each other.

The bracket 500 includes a plate-shaped main body 510, fixing parts 520, and a coolant output port 530 formed through the middle of the main body 510. The main body 510 is provided at each end thereof with a concave and convex part 511 corresponding in shape to a concave and convex structure of the rears of the sub-modules 200. Each of the fixing parts 520 is provided with a fastening hole, through which the bracket is fastened and fixed to the rears of the sub-modules 200.

FIG. 15 is a plan view showing the flow of a coolant in a battery module assembly according to the present invention, and FIG. 16 is a view showing another embodiment of the present invention.

First, referring to FIG. 15 together with FIG. 14, the sub-modules 200 are provided at central parts thereof with a coolant flow channel 250, defined by the bracket 500 mounted at the rears of the sub-modules 200 and a main bus bar 400 (see FIG. 18) mounted at the fronts of the sub-modules 200, along which a coolant (not show) may flow. Consequently, a coolant may be introduced through the side cover plates 300 to cool the battery cells (not shown) mounted in the sub-modules 200, flow along the central coolant flow channel 250, and then discharged through the coolant outlet port 530 formed at the bracket 500.

Meanwhile, the flow rate of the coolant introduced through the side cover plates 300 is decided based on the size of the coolant inlet ports 311a and 311b formed at the main body 310 of each of the side cover plates 300. The size of the second inlet ports 311b located at the rear part C of the battery module assembly is greater than that of the first inlet ports 311a located at the front part B of the battery module assembly. For this reason, the flow rate of the coolant introduced into the front part of the battery module assembly may be equal to that of the coolant introduced into the rear part of the battery module assembly even though the distances between the first inlet ports and the coolant outlet port are different from those between the second inlet ports and the coolant outlet port.

According to circumstances, as shown in FIG. 16, a fan 550 or a discharge duct (not shown) may be mounted at the position of the bracket 500 at which the coolant outlet port is formed in order to further improve the cooling effect.

FIG. 17 is a plan view showing the flow of a coolant in a battery module assembly according to a further embodiment of the present invention.

Referring to FIG. 17 together with FIGS. 14 and 15, the battery module assembly is identical in structure to the battery module assembly shown in FIG. 15 except that an outer case 901 is further mounted to the battery module assembly.

Specifically, the outer case 901 is provided at opposite ends thereof with coolant inlet ports 901 and 902, through which a coolant may be supplied to the battery module assembly received in the outer case 901. A coolant introduced through the coolant inlet ports 901 and 902 flows through the side cover plates 300 to cool the battery cells (not shown) mounted in the sub-modules 200, flow along the central coolant flow channel 250, and then discharged through the coolant outlet port 530 formed at the bracket 500.

FIG. 18 is a perspective view showing a state in which two sub-modules are electrically connected and fixed to each other via a main bus bar, and a base plate, an upper cover plate, and a front cover plate are mounted to the sub-modules.

Referring to FIG. 18, external input and output terminals 162 and 161 of the two sub-modules 200 are electrically connected in series to each other via the main bus bar 400. In addition, the two sub-modules 200 are fixed by the main bus bar 400 such that the sub-modules 200 are spaced apart from each other by a predetermined distance.

In addition, after the two sub-modules 200 are loaded on the base plate 600, the upper surfaces of the two sub-modules 200 are protected by the upper cover plate 700, and the front surfaces of the two sub-modules 200 are protected by the front cover plate 800.

FIG. 19 is a perspective view showing the battery module assembly according to the present invention.

Referring to FIG. 19 together with FIG. 18, reinforcement beads 750 and 650 configured to have a concave and convex structure for improving rigidity of the upper cover plate 700 and the base plate 600 are formed at outer surfaces of the upper cover plate 700 and the base plate 600.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module assembly according to the present invention is configured to have a structure in which the battery module assembly includes sub-modules arranged in a lateral direction in a state of being spaced apart from each other to provide a coolant flow channel having a specific structure, side cover plates having a coolant inlet port, and a bracket having a coolant outlet port, thereby restraining the increase in volume of the battery module assembly and, at the same time, achieving an improved cooling effect and a uniform cooling effect of the battery module assembly. In addition, the battery module assembly is assembled to have a compact structure, and no additional component for improving cooling efficiency of the battery module is needed, thereby improving efficiency of a production process while providing the compact structure.

The invention claimed is:

1. A battery module assembly comprising unit modules, each of which comprises unit cells mounted to a cartridge in a state of being electrically connected to each other via bus bars, the battery module assembly comprising:
   a base plate;
   two or more sub-modules loaded on the base plate, each of which comprises two or more unit modules vertically stacked relative to the base plate to form a coolant flow channel at an interface therebetween, the coolant flow path extending parallel to the base plate, the sub-modules being arranged in a lateral direction in a state of being spaced apart from each other to provide the coolant flow channel;
   side cover plates mounted at sides of the sub-modules, each of the side cover plates having at least one coolant inlet port, through which a coolant is introduced; and
   a bracket for fixing ends of the sub-modules, the bracket being located between the sub-modules, the bracket having a coolant outlet port communicating with the coolant flow channel.

2. The battery module assembly according to claim 1, wherein each of the unit cells is a plate-shaped battery cell or a battery cell assembly comprising two or more plate-shaped battery cells mounted in a cell cover in a state in which electrode terminals of the battery cells are exposed.

3. The battery module assembly according to claim 2, wherein each of the battery cells is a prismatic secondary battery or a pouch-shaped secondary battery.

4. The battery module assembly according to claim 3, wherein the pouch-shaped secondary battery is configured to have a structure in which an electrode assembly is mounted in a laminate sheet comprising a resin layer and a metal layer in a sealed state.

5. The battery module assembly according to claim 2, wherein the cell cover comprises a pair of sheathing members coupled to each other for covering outer surfaces of the battery cells excluding the electrode terminals.

6. The battery module assembly according to claim 1, wherein the unit cells of each of the unit modules are connected in parallel to each other.

7. A battery module assembly comprising unit modules, each of which comprises unit cells mounted to a cartridge in a state of being electrically connected to each other via bus bars, the battery module assembly comprising:
- two or more sub-modules, each of which comprises two or more unit modules vertically stacked from a ground to form a coolant flow channel at an interface therebetween, the sub-modules being arranged in a lateral direction in a state of being spaced apart from each other to provide the coolant flow channel;
- a base plate, on which the sub-modules are loaded;
- side cover plates mounted at sides of the sub-modules, each of the side cover plates having at least one coolant inlet port, through which a coolant is introduced; and
- a bracket for fixing ends of the sub-modules, the bracket having a coolant outlet port communicating with the coolant flow channel,
- wherein the unit cells of each of the unit modules are connected in parallel to each other, and
- wherein the unit cells are mounted to the cartridge such that the electrode terminals face each other, and the electrode terminals are connected in parallel to each other via bus bars mounted to the cartridge.

8. The battery module assembly according to claim 1, wherein each cartridge is provided at opposite sides thereof with protrusions each having a fastening hole, and the cartridges are coupled to each other using fastening members inserted through the fastening holes to constitute the sub-modules.

9. The battery module assembly according to claim 1, wherein the unit modules of each of the sub-modules are connected in series to each other.

10. The battery module assembly according to claim 1, wherein one end of a surface of each of the bus bars, to which a corresponding one of the electrode terminals is coupled, is bent upward or downward, and the bent end is connected to a series connection member such that adjacent unit modules are connected in series to each other.

11. A battery module assembly comprising unit modules, each of which comprises unit cells mounted to a cartridge in a state of being electrically connected to each other via bus bars, the battery module assembly comprising:
- two or more sub-modules, each of which comprises two or more unit modules vertically stacked from a ground to form a coolant flow channel at an interface therebetween, the sub-modules being arranged in a lateral direction in a state of being spaced apart from each other to provide the coolant flow channel;
- a base plate, on which the sub-modules are loaded;
- side cover plates mounted at sides of the sub-modules, each of the side cover plates having at least one coolant inlet port, through which a coolant is introduced; and
- a bracket for fixing ends of the sub-modules, the bracket having a coolant outlet port communicating with the coolant flow channel,
- wherein each of the side cover plates comprises:
- a main body for covering a corresponding one of the sides of the sub-modules;
- fixing parts formed at opposite ends of the main body, the fixing parts extending while being bent in a shape of covering the sub-modules, the fixing parts being fastened and fixed to the sub-modules; and
- a handle formed at one end of the main body, and
- the coolant inlet port is formed at the main body.

12. The battery module assembly according to claim 11, wherein the coolant inlet port is formed in the shape of a circle, an oval, a polygon, or a slit when viewed above.

13. The battery module assembly according to claim 11, wherein the coolant inlet port comprises a first inlet port group comprising two or more first inlet ports and a second inlet port group comprising two or more second inlet ports, the first inlet port group being located at a front part of the battery module assembly, the second inlet port group being located at a rear part of the battery module assembly, in a direction in which the coolant is introduced into the battery module assembly.

14. The battery module assembly according to claim 13, wherein the second inlet ports have an area equivalent to 110 to 300% greater than that of the first inlet ports.

15. The battery module assembly according to claim 1, wherein
- the bracket comprises a plate-shaped main body, a fixing part, and an output port formed through a middle of the main body,
- the main body is provided at each end thereof with a concave and convex part corresponding in shape to a concave and convex structure of the rears of the sub-modules, and
- the fixing part is provided with a fastening hole, through which the bracket is fastened and fixed to the rears of the sub-modules.

16. The battery module assembly according to claim 1, wherein the coolant flow channel defined between the sub-modules and the coolant outlet port of the bracket are formed in a straight line when viewed above.

17. The battery module assembly according to claim 1, wherein a fan or a discharge duct is mounted at the coolant outlet port of the battery module assembly.

18. The battery module assembly according to claim 1, further comprising:
- an upper cover plate loaded on top surfaces of the sub-modules, the upper cover plate being fastened and coupled to the sub-modules and the side cover plates; and
- a front cover plate mounted at fronts of the sub-modules in a direction in which the coolant is introduced into the battery module assembly, the front cover plate being fastened and coupled to the sub-modules, the base plate, and the side cover plates.

19. A device comprising a battery module assembly according to claim 1 as a power source.

20. The battery module assembly according to claim 19, wherein the device is an electric vehicle, a hybrid electric vehicle, a plug-in hybrid electric vehicle, a power storage apparatus, a power supply for emergency, a power supply for computer rooms, a portable power supply, a power supply for medical facilities, a power supply for fire extinguishing facilities, a power supply for alarm facilities, or a power supply for refuge facilities.

* * * * *